United States Patent
Yamaura et al.

(10) Patent No.: US 6,257,192 B1
(45) Date of Patent: Jul. 10, 2001

(54) FOUR CYCLE ENGINE LUBRICATION STRUCTURE

(75) Inventors: Hiroshi Yamaura; Koji Terada, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/393,191

(22) Filed: Sep. 10, 1999

(30) Foreign Application Priority Data

Sep. 12, 1998 (JP) .................................. 10-276593

(51) Int. Cl.[7] .................................................... F16F 15/26
(52) U.S. Cl. ............................................................. 123/196 R
(58) Field of Search .......................... 123/196 R, 198 R, 123/195 C, 192.2, 196 CP, 196 W; 184/6.5, 6.8

(56) References Cited

U.S. PATENT DOCUMENTS 4,793,301 * 12/1988 Ishikawa ........................ 123/192.2
5,065,841 * 11/1991 Takagaki ........................ 123/192.2
5,960,764 * 10/1999 Araki ............................. 123/196 R

FOREIGN PATENT DOCUMENTS 63-22356   6/1988 (JP) .
8-135419 * 5/1996 (JP) .

* cited by examiner

*Primary Examiner*—Willis R. Wolfe
*Assistant Examiner*—Hyder Ali
(74) *Attorney, Agent, or Firm*—Birch, Stewart, Kolasch & Birch, LLP (57) ABSTRACT

The inside of a crankcase for a four-cycle engine is divided by a bulkhead into a crank chamber and a transmission chamber. A crankshaft and a balancer shaft for suppressing engine vibrations by rotating in accompaniment with rotations of the crankshaft are rotatably attached within the crankshaft, and the balancer shaft is driven by the crankshaft via a gear set housed within the crank chamber. Meshing parts of a gear set can be sufficiently lubricated by oil mist without a special lubricating structure being required. Furthermore, the engine can be decreased in size without forming a sealed space for lubricating the gear set.

24 Claims, 5 Drawing Sheets

FOUR CYCLE ENGINE LUBRICATION STRUCTURE

BACKGROUND OF THE INVENTION

1. Field of the Invention

The present invention relates to a four-cycle engine and an improvement to a lubrication structure therefor.

2. Description of Related Art

In, for example, Utility Model Laid-open Publication No. Sho. 63-22356, entitled "Two-cycle Internal Combustion Engine Vibration Control Assembly", there is disclosed in FIG. 2 a crankcase 3, a crankshaft 7 and a balancing weight 13 housed in a rotatable manner within this crankcase 3, a support shaft 23 extending out of the crankcase 3 from an end of the crankshaft 7, a gear 14 attached to the support shaft 23, a support shaft 24 extending out of the crankcase 3 from an end of the shaft for the balancing weight 13, and a gear 15 attached to the support shaft 24 and meshing with the gear 14 in such a manner as to rotate the balancing weight 13.

In the above technology, it is necessary to lubricate the meshing part of the gear 14 and the gear 15 and special apparatus is therefore necessary to spray oil on the meshing parts and to gather up the remaining oil. Therefore, costs are substantially increased.

The gear 14 and gear 15 have to be sealed from the outside due to this lubrication. Therefore the engine is increased in size, causing many disadvantages.

SUMMARY OF THE INVENTION

It is therefore an object of the present invention to provide an engine lubrication structure that does not require a special structure for lubricating a gear set for driving a balancer shaft. This provides the advantage of enabling the engine to be made smaller.

In order to achieve the above object, a first aspect of the present invention includes an inside of a crankcase of a four-cycle engine divided by a bulkhead into a crank chamber and a transmission chamber. A crankshaft and a balancer shaft for suppressing engine vibrations by rotating in accompaniment with rotations of the crankshaft are rotatably attached within the crankshaft. Furthermore, the balancer shaft is driven by the crankshaft via a gear set housed within the crank chamber.

The volume of the crank chamber decreases because the crankcase is divided into a crank chamber and a transmission chamber and a thick oil mist is formed within the crank chamber.

By housing the gear set within the crank chamber the meshing part of the gear set is sufficiently lubricated by the oil mist and special lubricating apparatus is therefore not required.

Furthermore, regarding the related art where the gear set is provided outside of the crankcase, the engine can be made smaller in the present invention without having to form a sealed space for lubricating the gear set.

According to a second aspect of the present invention, an engine accessory driven by the balancer shaft is provided at an end part of the balancer shaft. Furthermore, a supply of oil for a bearing supporting the balancer shaft and a supply of oil for a bearing supporting a rotating axis of the engine accessory attached to the end part of the balancer axis are provided by oil mist filling up the inside of the crank case.

Each bearing can therefore be lubricated uniformly and in a sufficient manner by the oil mist within the crankcase regardless of the arrangement of the bearings, so that freedom of engine design is increased and engine durability is improved.

Furthermore, it is not necessary to separately lubricate the bearing of the engine accessory so that a dedicated structure for lubrication of the engine accessory is no longer necessary.

According to a third aspect of the present invention, a clutch for engaging and disengaging the transmission of force and a water pump constituting the engine accessory driven by the balancer shaft and circulating cooling water within the engine are arranged on the side of the crankcase. The clutch is covered from the outside by a cover. Furthermore, the water pump is completely separate from the cover covering the clutch.

Conventionally, since both the clutch and the water pump are covered by a single cover covering the clutch, the cover is large and a drain hole for the water pump is formed so as to be long enough to reach the cover surface. In the present invention, the water pump is completely separate from the cover covering the clutch and the cover can therefore be made smaller and lighter and can be assembled with greater ease. Furthermore, since the drain hole for the water pump can be made shorter, drainage is improved, since clogging with dirt can be prevented. Furthermore, the process of clearing the hole is made easier.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

The following is a description based on the attached drawings of an embodiment of the present invention. The drawings should be viewed in the direction of the numerals.

Figure 1:
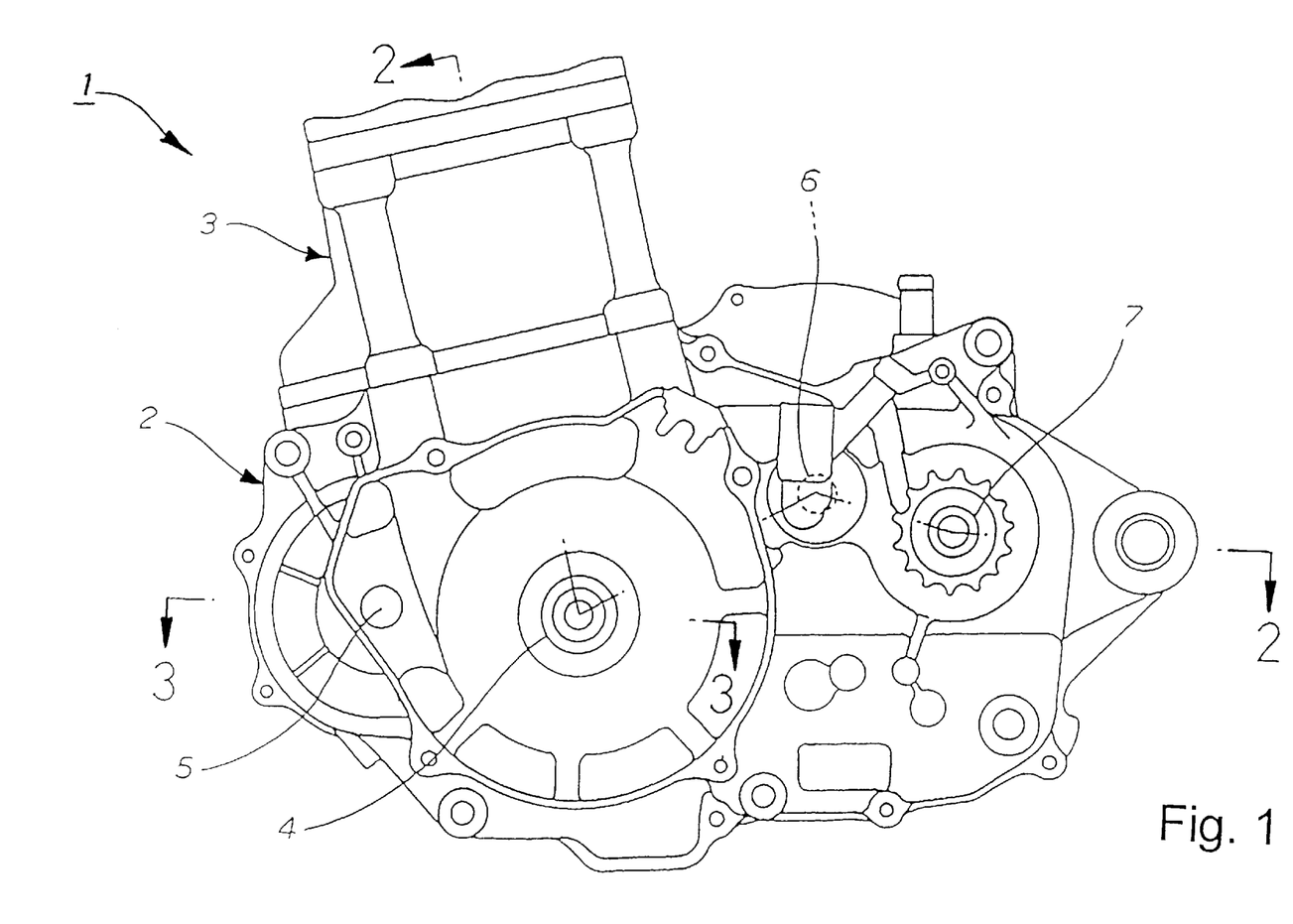
FIG. 1 is a side view from one side of an engine adopting the four-cycle engine lubrication structure of the present invention.

FIG. 1 is a side view of one side of an engine adopting the lubrication structure for the four-cycle engine of the present invention. For ease of description, an AC generator attached to an end of the crankshaft, a cover therefor, and a transmission-side cover have been removed in the drawings.

The engine 1 is equipped with a crankcase section 2 and a cylinder block 3. The crankcase section 2 houses a crankshaft 4, a balancer shaft 5 arranged to the front of the crankshaft 4, and a main shaft 6 and counter shaft 7 arranged on the transmission side to the rear of the crankshaft 4 in such a manner that the shafts are rotatable.

Figure 2:
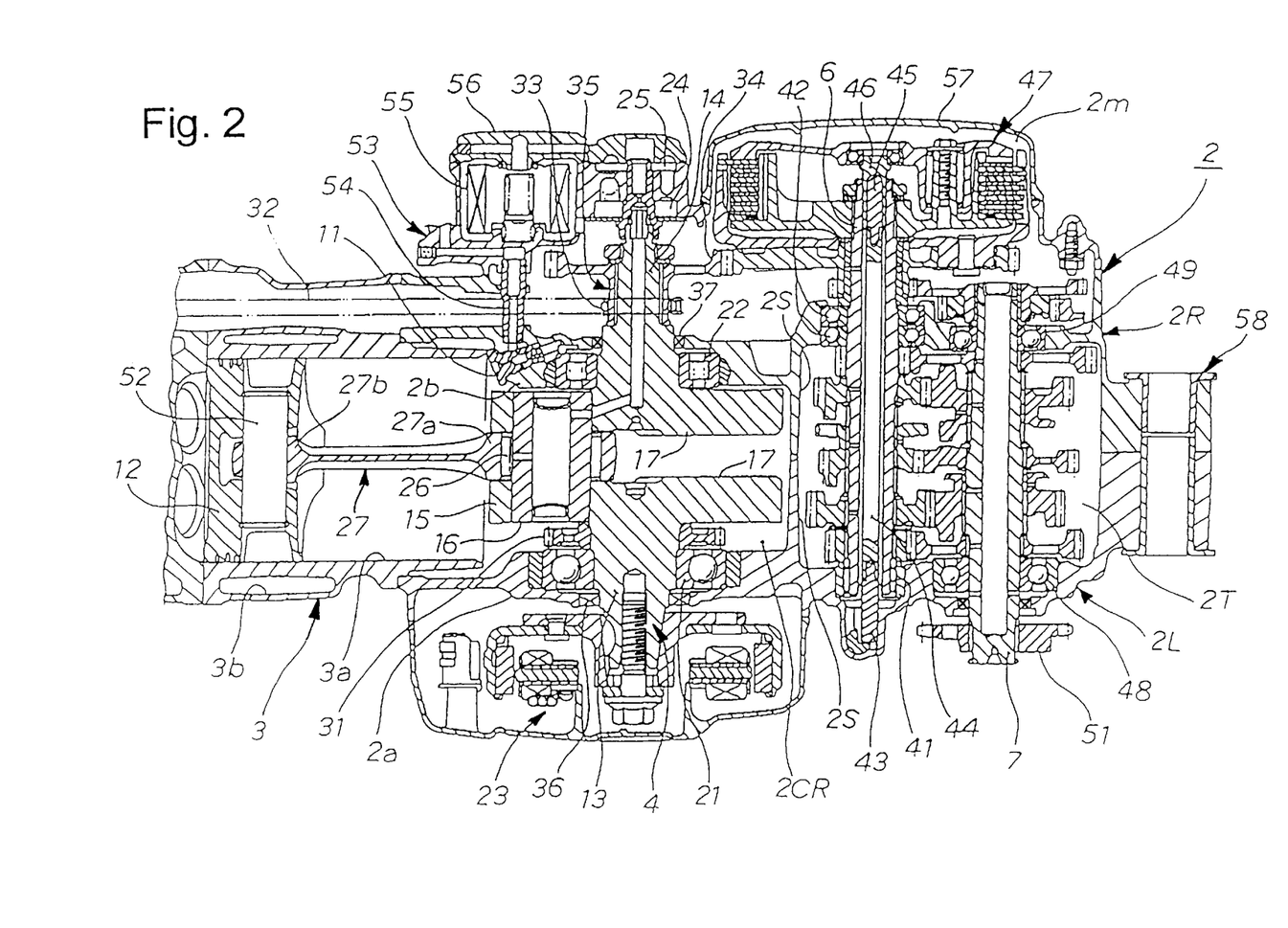
FIG. 2 is a cross-section taken along line 2—2 of FIG. 1.

FIG. 2 is a cross-section taken along line 2—2 of FIG. 1. The crankcase section 2 is a combination of crankcases 2L and 2R. The crankcase section 2 is partitioned into a sealed crank chamber 2CR and a transmission chamber 2T by bulkheads 2S and 2S.

The crankcase 2L is equipped with a first main shaft bearing 2a for attaching the crankshaft 4. The crankcase 2R is equipped with a second main bearing section 2b for attaching the crankshaft 4. Furthermore, an oil jet nozzle 11 for cooling the piston to be described later is attached at the cylinder block 3 of the second main bearing section 2b.

The cylinder block 3 is a water-cooled type where a piston 12 is inserted into a cylinder portion 3a so as to be movable and cooling water is supplied to a water jacket 3b.

The crankshaft 4 comprises first and second shaft sections 13 and 14, a crank portion 15 connecting the first and second shaft sections 13 and 14, a crank pin 16 attached to the crank portion 15 and counterweights 17 and 17 provided at the first and second shaft sections 13 and 14 on the opposite side to the crank portion 15 with respect to the axial center of the first and second shaft sections 13 and 14.

The crankshaft 4 is attached in a rotatable manner to the crankcase 2L via a radial ball bearing 21 and to the crankcase 2R via a radial roller bearing 22, with an AC generator 23 for generating electricity being attached to one end thereof and a first oil pump 24 and a second oil pump 25 for dry sump lubrication being attached to the other end thereof. A big end 27a of a connecting rod 27 is attached in such a manner as to be capable of being rotated with respect to the crank pin 16 via a bearing 26. A balancer shaft driving gear 31 for driving the balancer shaft 5 (refer to FIG. 1) is fitted around the first shaft section 13. A gear member 35 equipped with a cam shaft drive gear 33 for driving a cam shaft (not shown) via a chain 32 and a main shaft drive gear 34 for driving the main shaft 6 on the transmission side is attached to the second shaft portion 14. Numeral 36 and numeral 37 represent oil seals for preventing oil from leaking out from the crank chamber 2CR.

The main shaft 6 is attached to the crankcase 2L via a bearing 41 and to the crankcase 2R via bearings 42 and 42 in such a manner as to be capable of being rotated. The main shaft 6 also houses a first rod 43, second rod 44, third rod 45 and fourth rod 46 that are capable of moving in the axial direction. A clutch 47 is spline fitted to the outer periphery of one end thereof with a plurality of spline fitted drive gears being attached at the outer periphery thereof in such a manner as to be movable in the axial direction.

The first rod 43, second rod 44, third rod 45 and fourth rod 46 engage and disengage the clutch 47 as a result of movement in the axial direction so as to control transmission of driving force from the crankshaft 4 to the main shaft 6.

The counter shaft 7 is rotatably attached to the crankcase 2L via a bearing 48 and to the crankcase 2R via a bearing 49 and has a plurality of driven gears meshing in spline engagement with the drive gears of the main shaft 5 at the outer periphery thereof. The counter shaft 7 is capable of moving in an axial direction. The counter shaft 7 also has a drive sprocket 51 for driving a wheel (not shown) using a chain (not shown) attached to an end thereof.

The piston 12 is attached to a small end 27b of the connecting rod 27 via a piston pin 52 in such a manner as to be rotatable.

In FIG. 2, numeral 53 indicates a case side cover attached to the side of the crankcase 2R, numeral 54 indicates a coupling pipe for coupling the case side cover 53 and the second main bearing section 2b of the crankcase 2R, numeral 55 indicates an oil filter, numeral 56 indicates an oil filter cover, numeral 57 indicates a cover covering the outer side of the clutch 47, and numeral 58 indicates an attachment section for attaching the engine (refer to FIG. 1) to a vehicle frame (not shown).

The clutch 47 is covered by a side cover 59 comprising the case side cover 53 and the cover 57.

Figure 3:
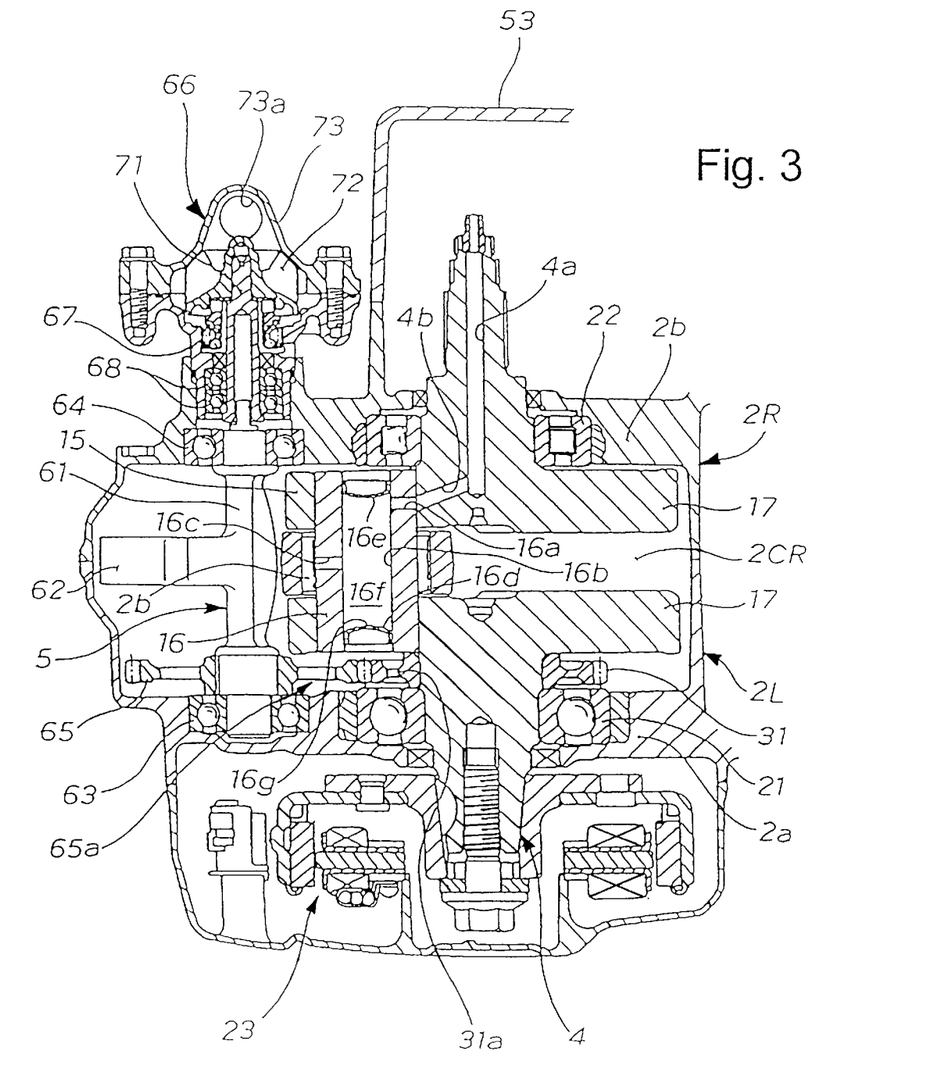
FIG. 3 is a cross-section taken along line 3—3 of FIG. 1.

FIG. 3 is a cross-section taken along line 3—3 of FIG. 1. The crankcase 2L has a radial ball bearing 21 attached to the first main shaft bearing 2a and the crankcase 2R has a radial roller bearing 22 attached at the second main bearing section 2b.

The crankshaft 4 is equipped with a first oil passage 4a and a second oil passage 4b continuing on from the first oil passage 4a.

The balancer shaft 5 comprises a shaft section 61 and a weight 62 provided at the center of the shaft section 61. The balancer shaft 5 rotates at a speed equal to the speed of the crankshaft 4 in a direction opposite to that of the crankshaft 4 in order to suppress engine oscillations. The balancer shaft 5 is rotatably attached to the crankcase 2L via a bearing 63 and to the crankcase 2R via a bearing 64. In the balancer shaft 5, the shaft section 61 has driven gears 65 at one end thereof, and is coupled, at the other end thereof, with a water pump 66 for circulating cooling water at the side of the bearing 64. The driven gears 65 mesh with the balancer shaft drive gears 31 that interlock with the crankshaft 4 at the shaft section 61.

A gear set 65a comprises the balancer shaft drive gear 31 and the driven gears 65.

The crank pin 16 is formed with a first lateral oil passage 16a communicating with the second oil passage 4b of the crankshaft 4, a hollow section 16b and a second lateral oil passage 16c, with the front end of the second lateral oil passage 16c facing the bearing 26, and plugs 16d and 16e being inserted at both ends of the hollow section 16b so that oil chamber 16f is formed in the crank pin 16.

An injection hole 16g is formed at the center of the plug 16d.

A plurality of through holes 31a (only one is shown in the drawing) are formed so as to be lined up about the periphery of the balancer shaft drive gear 31.

The water pump 66 comprises a base section 67 attached to the side of the crankcase 2R, a rotation shaft 71 attached to the base section 67 via bearings 68 and 68 in such a manner as to be rotatable and coupled with the balancer shaft 5, an impeller 72 attached to the rotation shaft 71 and a case section 73 housing the impeller 72 and being attached to the base section 67. An inlet port 73a is provided at the case section 73.

The water pump 66 is equipped with a drain hole opening downwards at the base section 67. The drain hole is for discharging water leaking from the seal portion to the outside so that this water does not infiltrate into the side of the bearings 68 and 68. Since this drain hole reaches the outer surface of the base section 67 from within the water pump 66, the drain hole is short, is difficult to clog up and has superior workability.

Figure 4:
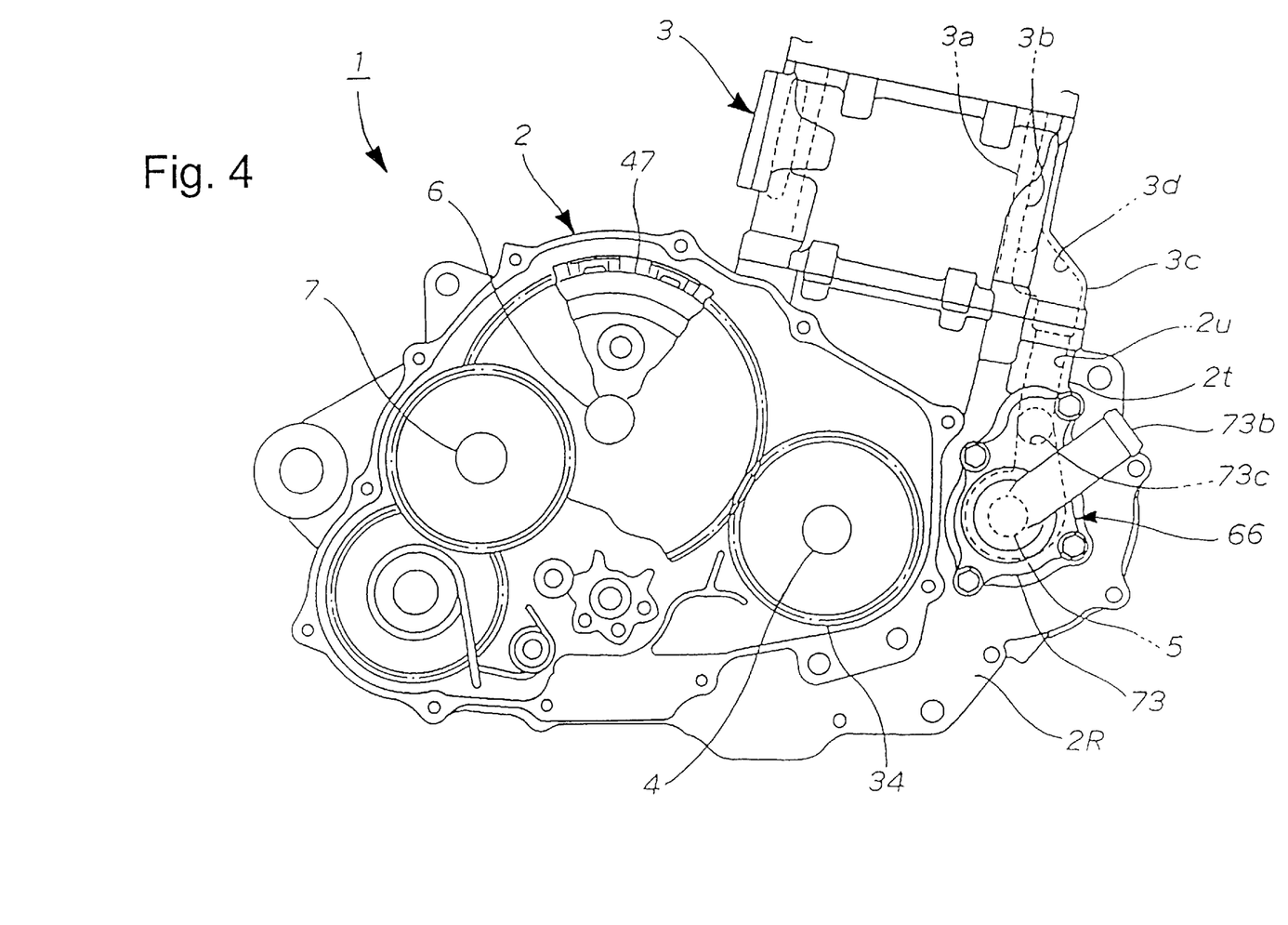
FIG. 4 is a side view from a further side of the engine of the present invention.

FIG. 4 is a further side view of the engine of the present invention, with the case side cover 53 removed for convenience.

The crankcase 2R is equipped with a cooling water path 2u for allowing cooling water to flow within a side wall 2t substantially above the balancer shaft 5.

The cylinder block 3 is formed with a bulging side-wall 3c and is equipped with a front cooling water path 3d communicating with a water jacket 3b, within the side wall 3c.

A water pump 66 is equipped with an inlet pipe 73b communicating with the side of a radiator (not shown) at the case section 73, and an outlet hole 73c for discharging cooling water from the case section 73 and communicating with the cooling water path 2u of the crankcase 2R.

The following is a description of the operation of the cooling water path described above.

When the water pump 66 is driven, cooling water cooled by the radiator is taken into the case section 73 from the inlet pipe 73b and is discharged from the outlet hole 73c by the impeller 72 (refer to FIG. 3).

Cooling water discharged from the outlet hole 73c flows through the cooling water path 2u of the crankcase 2R, flows through the front cooling water path 3d of the cylinder block 3 from the cooling water path 2u, reaches the inside of the water jacket 3b and cools the cylinder portion 3a.

Cooling water is supplied to the water jacket 3b of the cylinder block 3 from the water pump 66 via the cooling water path 2u within the crankcase section 2. The cooling water circulation path can therefore be made shorter than in the related art where cooling water discharged from the water pump is supplied to the cylinder block via pipes etc. provided outside the crankcase. Furthermore, the path resistance of the cooling water circulation path can be made small. In addition, since piping etc. is not provided externally, assembly of the engine 1 can be carried out in a straightforward manner and the number of parts can be reduced.

The following is a description of the operation of the above-described four-cycle engine lubrication structure.

Figure 5:
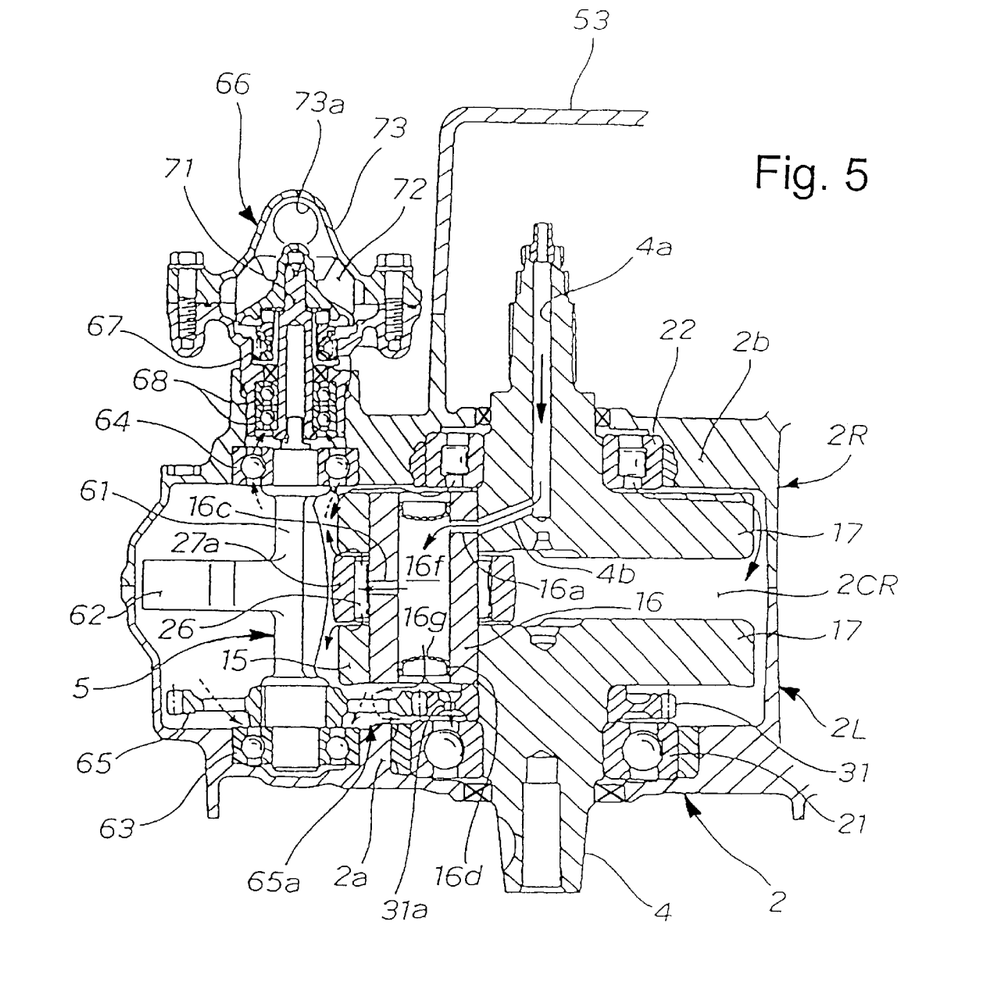
FIG. 5 is an operational drawing illustrating the operation of the four-cycle engine lubrication structure of the present invention.

FIG. 5 is an operational view illustrating the operation of the four-cycle engine lubrication structure of the present invention.

Oil sent from the second oil pump 25 (refer to FIG. 2) to the first oil passage 4a of the crankshaft 4 reaches the bearing 26 of the big end 27a of the connecting rod after passing through the second oil passage 4b, the first lateral oil passage 16a within the crank pin 16, the oil chamber 16f and the second lateral oil passage 16c, lubricates the bearing 26, and splashes from the gap between the crank portion 15 and the big end 27a to within the second crank chamber 2CR.

Oil in the oil chamber 16f of the crank pin 16 is sprayed from the injection hole 16g of the plug 16d and passes through the through holes 31a of the balancer shaft drive gear 31 so as to lubricate the radial ball bearing 21 and be sprayed about the periphery of the balancer shaft drive gear 31 within the crank chamber 2CR.

Oil supplied from the second oil pump 25 to the radial roller bearing 22 is sprayed from the gap between the second main bearing section 2b and the crankshaft 4 (crank portion 15 and counterweight 17) to within the crank chamber 2CR.

Since the volume of the crank chamber 2CR is small because the crankcase section 2 is divided into the crank chamber 2CR and the transmission chamber 2T (refer to FIG. 2), the oil sprayed from each of the parts within the crank chamber 2CR is a thick oil mist.

As shown by the dotted arrows, this oil mist passes through the meshing portions of the balancer shaft drive gear 31 and the driven gears 65, so as to reach the bearings 63 and 64 supporting the balancer shaft 5, lubricates the meshing portion and the bearings 63 and 64, flows within the bearing 64 so as to reach the bearings 68 and 68 of the water pump 66, and lubricates the bearings 68 and 68.

Lubrication can therefore be performed in a uniform and sufficient manner by the oil mist regardless of the arrangement of each bearing and other parts because the oil mist reaches each of the parts within the crank chamber 2CR. The degree of freedom in designing the engine is therefore increased and the durability of each part of the engine is increased.

It is therefore no longer necessary to increase the size of the case side cover as in the related art in order to lubricate the bearings 68 and 68 of the water pump 66. Furthermore, since a dedicated lubrication apparatus is no longer necessary, the side cover 59 can be miniaturized, made lightweight and be made easier to assemble. In addition, it is easy to form a drain hole for water leaking from the seal portion of the water pump.

A special lubrication apparatus is not required to lubricate the meshing portion of the gear set 65a. Moreover, regarding the providing of the gear set outside of the crank case in the related art, making the engine 1 smaller in accompaniment with the miniaturization of the side cover 59 can be achieved without forming a sealed space for lubrication of the gear set.

The present invention brings about the following results as a result of the above configuration. In the four-cycle engine lubrication structure according to the first aspect of the present invention, the inside of a crankcase is divided by a bulkhead into a crank chamber and a transmission chamber. A crankshaft and a balancer shaft are rotatably attached within the crankshaft, and the balancer shaft is driven by the crankshaft via a gear set. A thick oil mist can therefore be formed within the crank chamber, the meshing part of the gear set can be sufficiently lubricated and special lubricating apparatus is not required.

Furthermore, regarding the providing of the gear set outside of the crank case in the related art, the engine can be decreased in size without forming a sealed space for lubricating the gear set.

In the four-cycle lubrication structure according to the second aspect of the present invention, oil supplied to bearings supporting the balancer shaft and oil supplied to bearings supporting the rotating axis of the engine accessory is supplied using oil mist within the crankcase. Each bearing can therefore be lubricated uniformly and in a sufficient manner by the oil mist within the crankcase regardless of the arrangement of the bearings. Furthermore, the freedom of engine design is increased and engine durability is improved.

Furthermore, it is not necessary to separately lubricate the bearing of the engine accessory and a dedicated structure for lubrication of the engine accessory is no longer necessary.

In the four-cycle engine lubrication structure according to the third aspect of the present invention, a clutch and a water pump are arranged on the side of the crankcase, the clutch is covered from the outside by a cover, and the water pump is completely separate from the cover covering the clutch.

Conventionally, both the clutch and the water pump are covered by a single cover covering the clutch and the cover is therefore large and a drain hole for the water pump is formed so as to be long enough to reach the cover surface. In the present invention, the water pump is completely separate from the cover covering the clutch and the cover can therefore be made smaller, lighter and greater ease of assembly can be achieved. Furthermore, since the drain hole for the water pump can be made shorter, drainage is improved, clogging of dirt can be prevented and the process of clearing the hole is made easier.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lubrication structure for a four-cycle engine comprising:
   a bulkhead for dividing an inside of a crankcase for the four-cycle engine into a crank chamber and a transmission chamber;
   a crankshaft for being rotatably mounted within the crank chamber;
   a balancer shaft for suppressing engine vibrations by rotating in accompaniment with rotations of the crankshaft for being rotatably mounted within the crank chamber;
   a gear set for driving the balancer shaft, said gear set being mounted in said crank case; and
   an engine accessory driven by the balancer shaft is provided at an end part of the balancer shaft, said engine accessory being located external of said crank case.

2. The lubrication structure of claim 1, wherein oil mist filling up the inside of the crank case provides a supply of oil for a bearing supporting the balancer shaft and a supply of oil for a bearing supporting a rotating axis of the engine accessory.

3. The lubrication structure of claim 2, further comprising:
   a clutch for engaging and disengaging a transmission of force from the engine;
   said engine accessory is a water pump driven by the balancer shaft, said water pump is for circulating cooling water within the engine;
   a cover for covering an outside of the clutch; and
   the water pump is completely separate from the clutch cover.

4. The lubrication structure of claim 1, further comprising:
   a clutch for engaging and disengaging a transmission of force from the engine;
   a water pump constituting said engine accessory is driven by the balancer shaft, said water pump is for circulating cooling water within the engine;
   a cover for covering an outside of the clutch; and
   the water pump is completely separate from the clutch cover.

5. The lubrication structure of claim 1, said crank shaft further comprising:
   first and second shaft sections;
   a crank portion, said crank portion connecting said first and second shaft sections; and
   counterweights provided at the first and second shaft sections on a side opposite to the crank portion.

6. The lubrication structure of claim 5, wherein the crankshaft includes a first oil passage and a second oil passage formed therein, said first and second oil passages being in communication with each other.

7. The lubrication structure of claim 6, wherein said crank portion includes a crank pin attached thereto, said crank pin comprising:
   a first lateral oil passage formed therein, said first lateral oil passage being in communication with said second oil passage in said crankshaft;
   an oil chamber formed therein; and
   a second lateral oil passage formed therein, a front end of the second lateral oil passage is for facing a bearing of the engine, wherein oil supplied to the first oil passage flows through the second oil passage, the first lateral oil passage, the oil chamber, and the second lateral passage for lubricating the bearing of the engine.

8. The lubrication structure of claim 7, further comprising:
   plugs inserted at opposite ends of the oil chamber, at least one of the plugs including an injection hole formed therein; and
   said gear set includes a plurality of holes formed therethrough, wherein oil from the oil chamber is sprayed from the injection hole and passes through the holes in the gear set to lubricate the gear set and the inside of the crank chamber.

9. The lubrication structure according to claim 1, wherein said engine accessory is a water pump for circulating cooling water within the engine.

10. A four-cycle engine with a lubricating structure comprising:
    a crankcase;
    a bulkhead for dividing an inside of the crankcase into a crank chamber and a transmission chamber;
    a crankshaft rotatably mounted within the crank chamber;
    a balancer shaft for suppressing engine vibrations by rotating in accompaniment with rotations of the crankshaft, said balancer shaft being rotatably mounted within the crank chamber;
    a gear set for driving the balancer shaft, said gear set being mounted in said crank case; and
    an engine accessory driven by the balancer shaft is provided at an end part of the balancer shaft, said engine accessory being located external of said crank case.

11. The four-cycle engine of claim 10, wherein oil mist filling up the inside of the crank case provides a supply of oil for a bearing supporting the balancer shaft and a supply of oil for a bearing supporting a rotating axis of the engine accessory.

12. The four-cycle engine of claim 10, further comprising:
    a clutch for engaging and disengaging a transmission of force from the engine;
    said engine accessory is a water pump driven by the balancer shaft, said water pump is for circulating cooling water within the engine;
    a cover for covering an outside of the clutch; and
    the water pump is completely separate from the clutch cover.

13. The four-cycle engine of claim 10, further comprising:
    a clutch for engaging and disengaging a transmission of force from the engine;
    a water pump constituting said engine accessory is driven by the balancer shaft, said water pump is for circulating cooling water within the engine;
    a cover for covering an outside of the clutch; and
    the water pump is completely separate from the clutch cover.

14. The four-cycle engine of claim 10, said crank shaft further comprising:
   first and second shaft sections;
   a crank portion, said crank portion connecting said first and second shaft sections; and
   counterweights provided at the first and second shaft sections on a side opposite to the crank portion.

15. The four-cycle engine of claim 14, wherein the crankshaft includes a first oil passage and a second oil passage formed therein, said first and second oil passages being in communication with each other.

16. The four-cycle engine of claim 15, wherein said crank portion includes a crank pin attached thereto, said crank pin comprising:
   a first lateral oil passage formed therein, said first lateral oil passage being in communication with said second oil passage in said crankshaft;
   an oil chamber formed therein; and
   a second lateral oil passage formed therein, a front end of the second lateral oil passage is for facing a bearing of the engine, wherein oil supplied to the first oil passage flows through the second oil passage, the first lateral oil passage, the oil chamber, and the second lateral oil passage for lubricating the bearing of the engine.

17. The four-cycle engine of claim 16, further comprising:
   plugs inserted at opposite ends of the oil chamber, at least one of the plugs including an injection hole formed therein; and
   said gear set includes a plurality of holes formed therethrough, wherein oil from the oil chamber is sprayed from the injection hole and passes through the holes in the gear set to lubricate the gear set and the inside of the crank chamber.

18. The four-cycle engine of claim 10, wherein said engine accessory is a water pump for circulating cooling water within the engine.

19. A lubrication structure for a four-cycle engine, comprising:
   a bulkhead for dividing an inside of a crankcase for the four-cycle engine into a crank chamber and a transmission chamber;
   a crankshaft for being rotatably mounted within the crank chamber, said crank shaft including:
      first and second shaft sections;
      first and second oil passages formed in said first and second shaft sections;
      a crank portion, said crank portion connecting said first and second shaft sections and including a crank pin attached thereto, said crank pin including:
         a first lateral oil passage formed therein, said first lateral oil passage being in communication with said second oil passage in said crankshaft
         an oil chamber formed therein
         a second lateral oil passage formed therein, a front end of the second lateral oil passage is for facing a bearing of the engine, wherein oil supplied to the first oil passage flows through the second oil passage, the first lateral oil passage, the oil chamber, and the second lateral oil passage for lubricating the bearing of the engine; and
      counterweights provided at the first and second shaft sections on a side opposite to the crank portion;
   a balancer shaft for suppressing engine vibrations by rotating in accompaniment with rotations of the crankshaft for being rotatably mounted within the crank chamber; and
   a gear set for driving the balancer shaft, said gear set being mounted in said crank case.

20. The lubrication structure of claim 19, further comprising:
   plugs inserted at opposite ends of the oil chamber, at least one of the plugs including an injection hole formed therein; and
   said gear set includes a plurality of holes formed therethrough, wherein oil from the oil chamber is sprayed from the injection hole and passes through the holes in the gear set to lubricate the gear set and the inside of the crank chamber.

21. A lubrication structure for a four-cycle engine comprising:
   a bulkhead for dividing an inside of a crankcase for the four-cycle engine into a crank chamber and a transmission chamber;
   a crankshaft for being rotatably mounted within the crank chamber;
   a balancer shaft for suppressing engine vibrations by rotating in accompaniment with rotations of the crankshaft for being rotatably mounted within the crank chamber;
   a gear set for driving the balancer shaft, said gear set being mounted in the crank case;
   a clutch for engaging and disengaging a transmission of force from the engine;
   a water pump constituting an engine accessory is driven by the balancer shaft, said water pump is for circulating cooling water within the engine;
   a cover for covering an outside of the clutch; and
   the water pump is completely separate from the clutch cover.

22. A four-cycle engine with a lubricating structure comprising:
   a crankcase;
   a bulkhead for dividing an inside of the crankcase into a crank chamber and a transmission chamber;
   a crankshaft rotatably mounted within the crank chamber;
   a balancer shaft for suppressing engine vibrations by rotating in accompaniment with rotations of the crankshaft, said balancer shaft being rotatably mounted within the crank chamber;
   a gear set for driving the balancer shaft, said gear set being mounted in the crank case;
   a clutch for engaging and disengaging a transmission of force from the engine;
   a water pump constituting an engine accessory is driven by the balancer shaft, said water pump is for circulating cooling water within the engine;
   a cover for covering an outside of the clutch; and
   the water pump is completely separate from the clutch cover.

23. A four-cycle engine with a lubricating structure comprising:
   a bulkhead for dividing an inside of the crankcase into a crank chamber and a transmission chamber;
   a crankshaft rotatably mounted within the crank chamber, said crankshaft including:
      first and second shaft sections;
      first and second oil passages formed in said first and second shaft sections;
      a crank portion, said crank portion connecting said first and second shaft sections and including a crank pin attached thereto, said crank pin including:

a first lateral oil passage formed therein, said first lateral oil passage being in communication with said second oil passage in said crankshaft an oil chamber formed therein a second lateral oil passage formed therein, a front end of the second lateral oil passage is for facing a bearing of the engine, wherein oil supplied to the first oil passage flows through the second oil passage, the first lateral oil passage, the oil chamber, and the second lateral oil passage for lubricating the bearing of the engine;

counterweights provided at the first and second shaft sections on a side opposite to the crank portion;

a balancer shaft for suppressing engine vibrations by rotating in accompaniment with rotations of the crankshaft, said balancer shaft being rotatably mounted within the crank chamber; and a gear set for driving the balancer shaft, said gear set being mounted in said crank case.

24. The four-cycle engine of claim 23, further comprising:

plugs inserted at opposite ends of the oil chamber, at least one of the plugs including an injection hole formed therein; and said gear set includes a plurality of holes formed therethrough, wherein oil from the oil chamber is sprayed from the injection hole and passes through the holes in the gear set to lubricate the gear set and the inside of the crank chamber.

* * * * *